G. FLLISZ.
AUTOMOBILE FRAME.
APPLICATION FILED JULY 7, 1920.
1,372,497.
Patented Mar. 22, 1921.
2 SHEETS—SHEET 2.
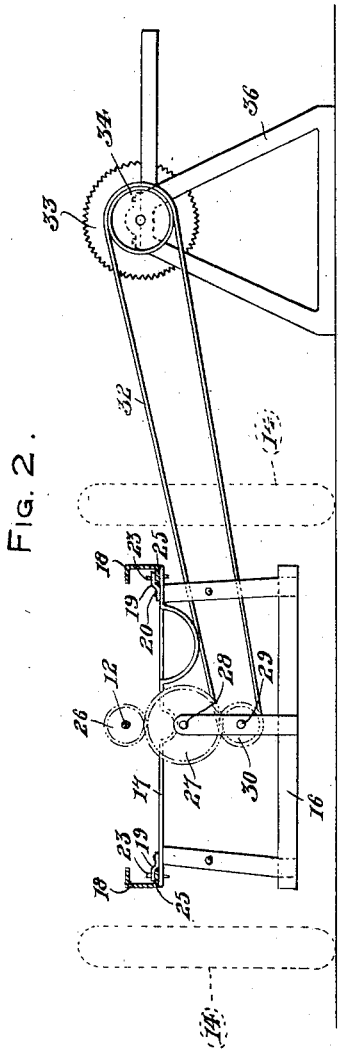
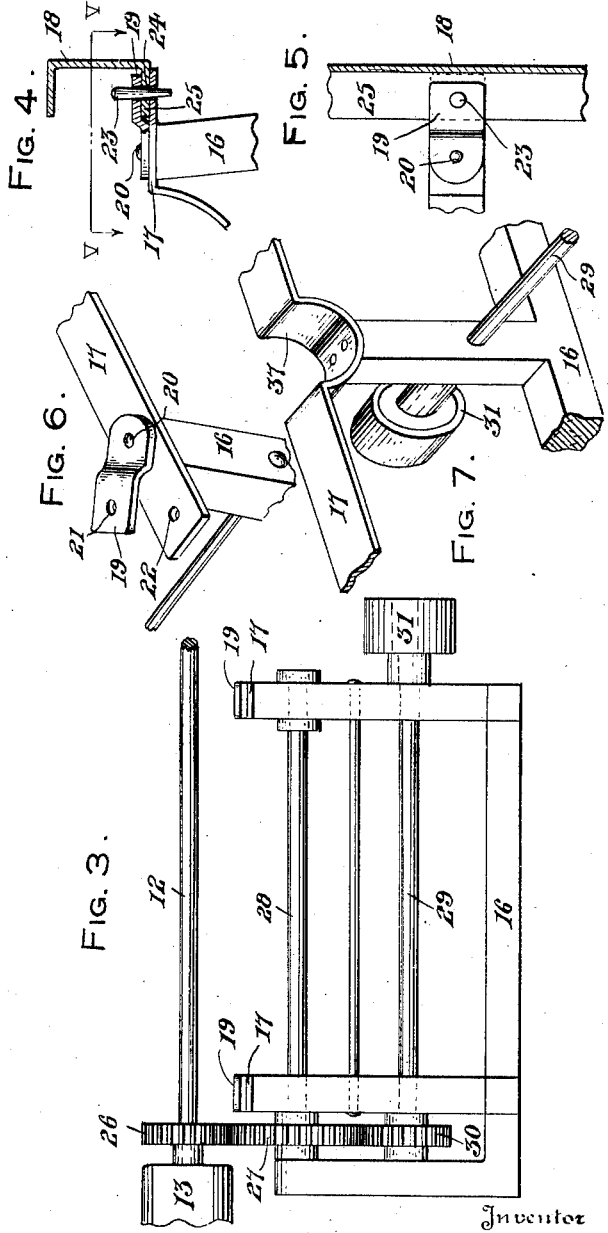
Inventor
G. Fllisz
By A. M. Wilson
Attorney

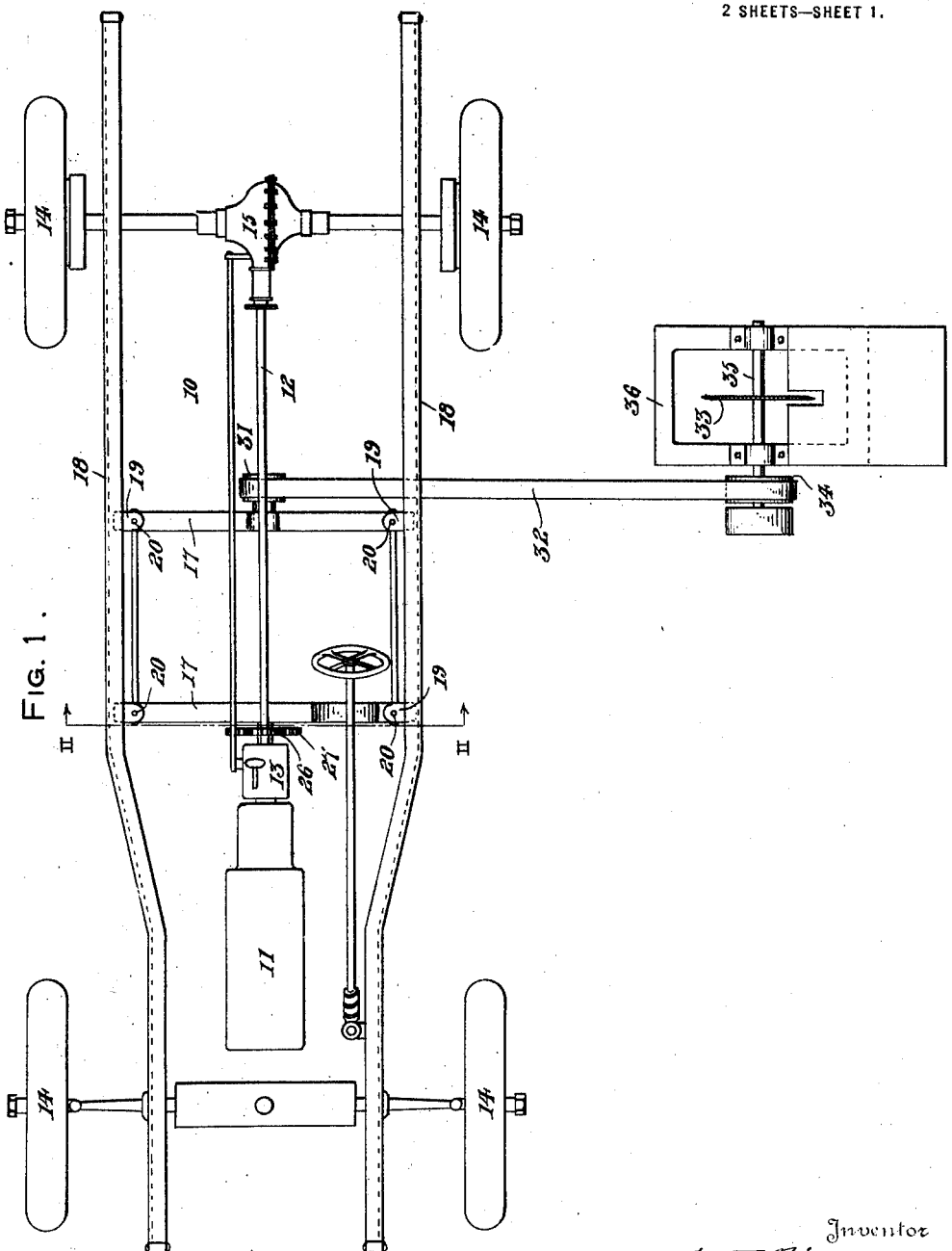

UNITED STATES PATENT OFFICE.

GEORGE FLLISZ, OF LIVERMORE, PENNSYLVANIA.

AUTOMOBILE-FRAME.

1,372,497.

Specification of Letters Patent.

Patented Mar. 22, 1921.

Application filed July 7, 1920. Serial No. 394,505.

*To all whom it may concern:*

Be it known that I, GEORGE FLLISZ, a citizen of Poland, residing at Livermore, in the county of Westmoreland and State of Pennsylvania, have invented certain new and useful Improvements in Automobile-Frames, of which the following is a specification.

The primary object of the present invention is the provision of a strong device adapted for ready attachment to the frame of an automobile for operating such a structure as a saw mill located at one side of the vehicle.

A further object of the invention is the provision of a detachable power plant for rendering the driving shaft of a motor vehicle serviceable for such purposes as operating rotary cutters the construction being such as to permit the employment of the usual clutch of the motor for controlling the operation of the device.

With these general objects in view and others that will appear as the nature of the invention is better understood, the same consists in the novel construction, combination, and arrangement of parts hereinafter more fully described, illustrated in the accompanying drawings, and pointed out in the appended claims.

In the drawings forming a part of this application and in which like designating characters refer to corresponding parts throughout the several views, Figure 1 is an elevational view of an automobile frame with my device operatively installed thereon and illustrated as employed for operating a saw, Fig. 2 is a front view of the device in the position noted with portions of the automobile shown in dotted lines and parts in vertical transverse section taken upon line II—II of Fig. 1, Fig. 3 is an enlarged side elevational view of a portion of the device showing the gear connection with the motor shaft, Fig. 4 is an enlarged vertical sectional view through the connection between the side rail of the automobile and the frame of the device, Fig. 5 is a horizontal detail section view taken upon line V—V of Fig. 4, Fig. 6 is a perspective view of a corner portion of the device showing one of the attaching means employed in its open position and Fig. 7 is a perspective view of the rear portion of the device.

Referring more in detail to the drawings, a chassis 10 is illustrated having a motor 11 with a rearwardly extending drive shaft 12 controlled in the usual manner by a clutch 13 so that during the running of the motor 11, the shaft 12 may be caused to turn or stand still at the will of the operator. The speed change gears for the rear drivers 14 are located in the differential housing 15, and have a neutral position, such as employed for instance in the Overland and the Saxon automobiles. A frame 16 provided for my invention has parallel transverse top bars 17 fitting beneath the angular side rails 18 of the chassis while latch plates 19 pivoted as at 20 to the bars 17 are readily positioned overlapping the lower flanges of the rails 18 for holding the frame 16 suspended beneath the vehicle.

A perforation 21 in each latch plate 19 is adapted to aline with a perforation 22 adjacent the end of the carrying rail 17 for readily positioning a pin 23 through the perforations 21 and 22 and also through the perforation 24 in the intervening lower flange 25 of the adjacent rail 18 as best illustrated in Fig. 4 of the drawings.

A pinion 26 is fixed to the power shaft 12, adapted for meshing with a gear 27 upon a stub shaft 28 journaled in the frame 16 is in its suspended position for operation. A driven shaft 29 journaled in the frame 16 has a pinion 30 in constant mesh with the gear 27 while a pulley 31 upon the shaft 29 outwardly of the frame 16 accommodates a belt 32 leading to one side of the vehicle for conveying power to any desired mechanism. A rotary saw such as 33 may be operated by the belt 32 running over a pulley 34 of the shaft 35 upon which the saw 33 is mounted, a suitable support or stand 36 forming a part of the saw structure. A depression 37 in the rear one of said bars 17 accommodates the motor shaft 12 when the frame 16 is sufficiently elevated although in the manner of attaching the device herein illustrated such depression 37 is not utilized.

The complete operation of the device will be apparent, the frame 16 being readily attached to the chassis when desired to employ the power pinion 26 and at which times the clutch 13 provides for starting and stopping the saw 33. The frame 16 is readily detachable and possesses great strength while this structure is simple and not likely to get out of order.

The preferred form of the invention is set forth herein although it will be understood that changes may be made in the same without departing from the spirit and scope of my invention.

What I claim as new and desire to secure by Letters Patent, is:—

1. In combination with a motor vehicle having angular side rails, a frame having cross bars adapted for positioning beneath said rails, latch plates pivoted to said bars adapted for overlapping portions of the rails, with the frame suspended beneath the rails, removable securing connections between said latch plates and bars, the said vehicle having a motor with a clutch controlled power shaft longitudinally of the vehicle, a pinion upon said power shaft above said frame, a gear journaled in the said frame in mesh with said pinion when the frame is operatively suspended beneath the vehicle, a driven shaft journaled in the frame and operatively connected to the gear and a belt pulley carried by said power shaft rearwardly of the gear substantially centrally beneath the vehicle and motor shaft.

2. In combination with the chassis of a motor vehicle having a longitudinal motor shaft, a pinion upon said motor shaft, a detachable frame suspended from the side rails of the chassis, a shaft journaled in the frame and having a gear secured thereon so as to mesh with said pinion when the frame is attached to the side rails of the chassis, means to transfer power from said gear to a distant point laterally of the chassis, said frame including top cross bars adapted to be positioned against the under side of said side rails, latch plates pivoted to said bars and adapted for overlapping the side rails, and removable securing devices passing through the cross bars, latch plates and side rails.

In testimony whereof I affix my signature.

GEORGE FLLISZ.